(12) United States Patent
Gomez Sainz-Garcia

(10) Patent No.: US 9,268,400 B2
(45) Date of Patent: Feb. 23, 2016

(54) CONTROLLING A GRAPHICAL USER INTERFACE

(71) Applicant: Renergy Sarl, Luxembourg (LU)

(72) Inventor: Gerardo David Gomez Sainz-Garcia, London (GB)

(73) Assignee: RENERGY SARL, Luxembourg (LU)

( * ) Notice: Subject to any disclaimer, the term of this patent is extended or adjusted under 35 U.S.C. 154(b) by 51 days.

(21) Appl. No.: 14/073,344

(22) Filed: Nov. 6, 2013

(65) Prior Publication Data

US 2014/0132512 A1    May 15, 2014

(30) Foreign Application Priority Data

Nov. 14, 2012    (GB) .................................. 1220444.2

(51) Int. Cl.
    *G06F 3/033*    (2013.01)
    *G06F 3/01*     (2006.01)
    *G06F 3/0346*   (2013.01)

(52) U.S. Cl.
    CPC ................ *G06F 3/014* (2013.01); *G06F 3/017* (2013.01); *G06F 3/0346* (2013.01)

(58) Field of Classification Search
    CPC .... G06F 3/038; G06F 3/0338; G06F 3/03543
    USPC ................................................. 345/156–158
    See application file for complete search history.

(56) References Cited

U.S. PATENT DOCUMENTS

| | | | | |
|---|---|---|---|---|
| 8,902,198 | B1 * | 12/2014 | Karakotsios et al. | 345/175 |
| 2003/0227437 | A1 * | 12/2003 | Ramirez | 345/156 |
| 2004/0140964 | A1 * | 7/2004 | Wang et al. | 345/179 |
| 2004/0263473 | A1 | 12/2004 | Cho et al. | |
| 2006/0177103 | A1 * | 8/2006 | Hildreth | 382/107 |
| 2008/0036732 | A1 * | 2/2008 | Wilson et al. | 345/156 |
| 2008/0297474 | A1 * | 12/2008 | Blomqvist et al. | 345/158 |
| 2009/0051649 | A1 * | 2/2009 | Rondel | 345/156 |
| 2010/0177039 | A1 | 7/2010 | Grant et al. | |

(Continued)

FOREIGN PATENT DOCUMENTS

| | | |
|---|---|---|
| EP | 2511792 A1 | 10/2012 |
| GB | 2442973 A | 4/2008 |

(Continued)

OTHER PUBLICATIONS

GB Search Report; GB1220444.2; dated Apr. 4, 2013.

(Continued)

*Primary Examiner* — Kent Chang
*Assistant Examiner* — Mark Edwards
(74) *Attorney, Agent, or Firm* — Westman, Champlin & Koehler, P.A.; Z. Peter Sawicki; Amanda Prose

(57) ABSTRACT

Apparatus and methods for enabling a user to interact with movable control elements of a graphical user interface (GUI) by moving a hand 12, or one or more fingers 16, 18 of said hand 12 relative to a thumb 14 on said hand, in which the apparatus comprises: a camera adapted to be releasably mounted to said hand, and a processor adapted to receive signals representative of successive images captured by the camera during movement of said hand, or movement of the finger(s) of said hand relative to said thumb, to analyze said successive images to determine said movement, and to communicate with the GUI to control elements thereof in accordance with the determined movement.

16 Claims, 4 Drawing Sheets

(56) References Cited

U.S. PATENT DOCUMENTS

| | | |
|---|---|---|
| 2010/0199232 A1 | 8/2010 | Mistry et al. |
| 2012/0249417 A1 | 10/2012 | Cho et al. |

FOREIGN PATENT DOCUMENTS

| | | |
|---|---|---|
| GB | 2456942 A | 8/2009 |
| WO | 9921122 A1 | 4/1999 |
| WO | 2008010024 A1 | 1/2008 |
| WO | WO 2008010024 A1 * | 1/2008 |
| WO | 2008112519 A1 | 9/2008 |
| WO | 2009151400 A1 | 12/2009 |
| WO | 2013023088 A1 | 2/2013 |

OTHER PUBLICATIONS

GB Search Report; GB1220444.2; dated Mar. 7, 2013.

* cited by examiner

CONTROLLING A GRAPHICAL USER INTERFACE

FIELD OF THE INVENTION

This Application is based on and claims priority from British Patent Application No. 1220444.2, filed on Nov. 14, 2012 in the UK Intellectual Property Office, the disclosure of which is incorporated herein in its entirety by reference.

This invention relates to apparatus and methods for a user to exercise control over elements of a graphical user interface (GUI), particularly but not exclusively for computers which have control elements to enable the user to control the operation of the computer and the display of information on the computer's monitor.

BACKGROUND ART

Since the first commercially successful use of a GUI in the 1980s, the GUI has been adopted by most developers of computer operating systems and application software, and it is now used on or available for virtually all types of computers; GUIs are also employed, in differing forms, in a wide range of other products, such as industrial controls, televisions and other monitors, electronic games and toys. Typically, a user interacts with a GUI using a mouse, track ball, touch pad or the like, often in concert with a keyboard; interaction is also possible with a keyboard alone, however users find it faster, easier and often more intuitive to use a mouse, etc. rather than just a keyboard. The use of such device combines with the advantageously intuitive characteristics of the GUI to provide users with a simple way to interact with computers and the like, such that the use of such devices as mice, touchpads, trackballs, joysticks, etc. to provide a primary means of interaction with a GUI is almost ubiquitous today (with a keyboard, console or other control providing an important, secondary means of interaction).

The rapid and continuing development of electronic devices and software, and the massive increases in processing power and memory now available to the general population have begun to highlight limitations and disadvantages of typical GUI interface or interaction devices such as mice, touchpads, track balls and the like. Mice need to be positively held by a user, and need a preferably flat surface upon which they can be moved in order to effect many of their functions. Because they are designed to be moved over a flat surface, mice can only effectively provide control over a two-dimensional GUI (which limits their use in applications such as computer aided design or games, which are very often three-dimensional, or with the emerging three-dimensional displays and TVs); moreover, the range of control movement offered by a mouse is restricted by the size of the surface upon which the mouse sits (which is one reason why mice often incorporate a "scroll wheel"). Such limitations and disadvantages apply, to a greater or lesser extent, to similar GUI interface devices such as touchpads, trackballs and the like.

In computer gaming, manufacturers have attempted to address interaction with the GUI (or game), in different ways: initially, control/interaction was carried out through specialised consoles, which incorporated many of the functions of mice, etc., but in a different format. These consoles began to be equipped with accelerometers, or other means which were able to recognise motion of the console (such as by the console having an infra-red transmitter, with movement of the console being monitored by remote infra-red sensors) and to translate this recognised movement into instructions for player-game interaction. Consoles designed to be held in two hands were replaced by smaller consoles which a user could hold in a single hand, allowing a user to play electronic games such as tennis or golf. A later and ongoing advance in the gaming field is to provide a way of registering movement or gestures made by the user (as opposed to something held or carried by the user) and translating these into instructions for the game; such an approach is now also being adopted by the manufacturers of other equipment, such as the so-called "smart" TVs, where it is becoming more common to enable a user to interact with the GUI by way of gestures alone. Such an approach is attractive, because it facilitates a very intuitive interaction, however it has a number of disadvantages. It requires sophisticated and sensitive sensors in order first to capture the movement of a user, then it requires significant amounts of processing capability to analyse the movement and to translate it into the instructions or controls which are intended by the user and also causing significant latency; as a result, such systems today are reasonably reliable in interpreting gross movements and converting these into controls to the GUI, but less so where smaller or more precise and/or rapid movements or gestures are concerned. They often have a limited field of view, limiting the range of movement of the user, or require some way of tracking the user, they risk being confused by movements other than by those of the user, and because they are most reliable with gross movements they are inherently slow to respond and limited in the range of different functionalities they can currently provide, because the range of gross movements available to a user is limited.

SUMMARY OF THE INVENTION

In a first aspect, the present invention provides an apparatus for enabling a user to interact with movable control elements of a graphical user interface (GUI) by moving a hand, or one or more fingers of said hand relative to a thumb on said hand, the apparatus comprising: a camera adapted to be releasably mounted to said hand, and a processor adapted to receive signals representative of successive images captured by the camera during movement of said hand, or of movement of the finger(s) of said hand relative to said thumb, to analyse said successive images to determine said movement, and to communicate with the GUI to control elements thereof in accordance with a determined movement.

With such an arrangement a user can acquire the movement functionality offered by conventional GUI interface devices such as a mouse without having to hold anything, merely by moving the hand to which the camera is attached. This movement is absolute, in that it is not necessary for the camera or indeed the hand to be pointed directly at the GUI or even the GUI element being controlled; although in practice it would probably be more intuitive for the user to point at the element. The camera, which may be mounted to the user's thumb, is not necessarily pointed at the GUI element being controlled; because the processor reacts to movements which are determined from differences between successive images captured by the camera, the camera can be point in any direction—although in practice it is expected that the most intuitive way of operating would be for a user to point at the GUI element with an index finger and to then move the hand in the direction the user wishes the element to move, whilst maintaining the positions of the finger and thumb relative to each other substantially constant. Moreover, using fairly simple processing steps (as will be described below) to analyse the images captured by the simple camera, it is possible for a single camera to provide information on four degrees of movement of the hand (three translational and one rotational); this allows this invention to be used to provide control of a GUI in three dimensions, a function denied conventional GUI interface devices such as mice. Such an arrangement is not restricted by the size of any surface, because a user can orient or move his hand in any direction, by more than 360 degrees if required (by circling the entire arm), and thereby move the field of view of the camera by an effectively unlimited extent, thus controlling the motion of a pointer or cursor, for example, within a GUI to the same extent, which obviates the requirement for a scroll wheel. With such an arrangement, a user can rapidly switch between using the camera to control items in the GUI and using the keyboard without having to pick up and realign the mouse or other device with the GUI, as pointing at the GUI with the apparatus of the present invention is inherently quicker and even more intuitive than using a mouse, or other known devices.

The apparatus may comprise a camera, a 3D accelerometer, optionally a processor to process the video feed directly into GUI signals, and a power pack, which can be implemented in a very small, self-contained module which can be attached to a user's thumb by a ring or elasticated strap, or similarly to the hand or wrist. A transmitter can be provided in the module, to transmit the processed signals, or the unprocessed signals to a remote processor for carrying out the analysis, etc. This remote processor may be incorporated, with a receiver adapted to communicate with the transmitter, in the device operating the GUI, or it can be software based in the device driver so that the image processing may be carried out internally on the device operating the GUI—such as the computer, tablet, TV, or game console. The transmitter/receiver arrangement may be a WLAN, WiFi, Bluetooth or similar system. Such an arrangement is an improvement on existing GUI interface devices because, as mentioned above, a user does not have to hold anything, once the module has been mounted or strapped to the user's hand, thumb or wrist, in order to control the GUI.

To enable the module to be as small as possible but to be usable over reasonable periods of time it is important for the arrangement to be energy efficient; accordingly the module may be adapted to turn itself off or to sleep, or there may be a switch provided on the ring or strap to power off the module, or this could also be carried out by the user tapping a solid surface like a table when the user does not wish to pass any instructions to the GUI or where there have been no instructive hand movements for a predetermined period of time. The same switch could be used to power up or wake the module, or this could also be carried out by the user shaking the hand (an accelerometer being provided in the module for sensing this and the tapping motion described above, and also to improve the quality of the perceived hand movement by being a redundant way to sense its motion).

The camera may be adapted to be sensitive to high contrast areas in its field of view, and the processor adapted in its analysis to track said high contract areas and to compare the position of said high contrast areas in successive images to determine motion of said high contrast areas between images in order to determine movement of said hand. The camera may be a normal video camera, or it may be infra-red enabled (or there may be a separate infra-red camera or sensor), the processor suitably being programmed to look for high contrast areas such as a window, door frame or anything in the camera images which has a dark pixel next to a light one, in order to determine the absolute (i.e. relative to the surrounding environment) motion of the user's hand (or, more accurately, absolute motion of the camera) by analysing the movement in the camera field of view from the differences between successive camera images.

The processor may be adapted to divide the field of view of the camera into a plurality of sectors, and to search in each sector at least one high contrast area, to determine at least one 2-dimensional vector relating to the movement of each high contrast area between successive images. The vectors of each high contrast area in each sector is analysed and combined to obtain a General 2-dimensional Vector for each sector, and each individual General sector movement vector will be processed in order to determine 2-dimensional or 3-dimensional (when enabled) movement of the hand (or camera). Having several sectors and general sector movement vectors improves the accuracy of the motion sensing, and also allows the processor to determine movement in different locations of the camera view, thus being able to interpret if an object is getting closer or farther away and sense 3-dimensional movement of the camera. In the event there are too few high contrast areas in the camera field of view (such as where the camera is directed towards a monochromatic surface) the processor could actuate the infra-red capability, use the built in accelerometer, or it could wait until sufficient high contrast areas enter the camera field of view and/or chose to ignore some of the images captured by the camera, or it could cause the GUI to display a message to alert the user. To compensate for environments where there are few high contrast features for the camera to pick up, the arrangement may comprise another camera, aligned in a different direction relative to the first camera so as to capture a different field of view. The processor may analyse differences between any images provided that they are in temporal order (i.e., the comparison is made between a first image and any image captured subsequently), and the term "successive" used herein should be interpreted accordingly. The vectors relating to the movement of each high contrast sector may suitably be direction and/or velocity vectors.

So far the invention has been described in respect of its ability to emulate the movement functionality of conventional GUI interface devices. The processor may be adapted to interpret the obscuring of a substantial portion of the field of view of the camera by a fingertip coming into contact with said thumb as a predetermined instruction to the GUI.

Such an arrangement may easily be envisaged where the camera is mounted so as to look along the user's thumb. When the user puts the tip of his index finger against his thumb tip of his right hand, the left hand portion of the camera field of view is obscured. The processor can be configured or programmed to interpret such a gesture in exactly the same way as a mouse interprets an input to the left button of a right hand-configured mouse, with a single brief tap of the index finger on the thumb being equivalent to a "left click" of the mouse, a double tap as a "double left click" and a single, prolonged or held tap as equivalent to a "click and drag" (with the motion of the "drag" being provided by the unobscured half of the camera field of view); when a user taps his middle finger against the tip of the thumb, the right hand portion of the camera field of view is obscured, and this can be interpreted analogously by the processor, to give the same functionality as the right hand button of the mouse, a double tap as a "double right click" and a single, prolonged or held tap as equivalent to a "right click and menu select" (with the motion of the "menu select" being provided by the unobscured half of the camera field of view). As those skilled in the art would appreciate, such an arrangement is equally as easily re-configurable between right and left handed use as a conventional mouse. An additional function can be provided when the index finger and middle finger tips contact the thumb tip simultaneously; in this case, the entire field of view of the camera would be obscured, so this gesture could not be used to provide a "drag" functionality but it could still provide other control functions, such as a double click, activating a verbal command interface program, switching between applications, or some other predetermined desired function for a gaming application for example. As already mentioned, arrangements in accordance with the present invention obviate the requirement for a scroll wheel, however this and other functions could be provided by a user employing two, similar arrangements, one on each hand (for example, to enable zooming in or out of a document, or pointing and shooting two weapons at the same time in a first person game)—something neither facilitated by conventional mice, etc., nor as straightforwardly intuitive as in the present invention.

The invention also provides a method of interacting with a GUI using a camera mounted to the hand or thumb of a user, the method comprising moving the hand in relation to an element of the GUI, sensing the absolute movement of the hand or thumb and controlling said element in accordance with the sensed movement. The camera may be pointed in a direction other than directly at the element of the GUI, as already mentioned.

In other aspects, the invention also provides: use of the gesture of closing an index finger tip onto a thumb tip of a user's hand as a predetermined instruction to a GUI; use of the gesture of closing a middle finger tip onto a thumb tip of a user's hand as a predetermined instruction to a GUI; use of the gesture of simultaneously closing an index finger tip and a middle finger tip onto a thumb tip, all of a user's hand, as a predetermined instruction to a GUI, and the use of tapping or shaking of a user's hand as a predetermined instruction to a GUI. The predetermined instructions may emulate those capable of being provided to a GUI via a computer mouse. As will be understood from the foregoing, these gestures may easily be applied or sensed in different ways or sequences to provide a variety of different instructions or functions from a plurality of similar gestures to give a user a simple and intuitive way to interact with and/or control a computer, tablet, game, TV or the like via its GUI.

BRIEF DESCRIPTION OF THE DRAWINGS

An embodiment of the present invention will now be described by way of example, with reference to the accompanying figures in which;

FIG. 1c illustrates the view captured by the camera of the device of FIG. 1a;

DETAILED DESCRIPTION OF THE EMBODIMENTS

Figure 1A:
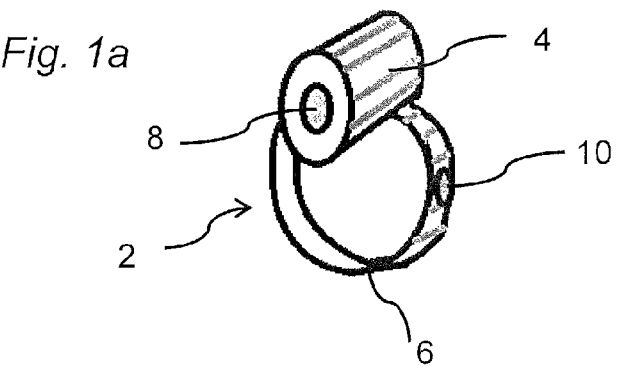
FIG. 1a is a view of a device for fitting to a user's thumb forming part of an apparatus in accordance with the invention.
Figure 1B:
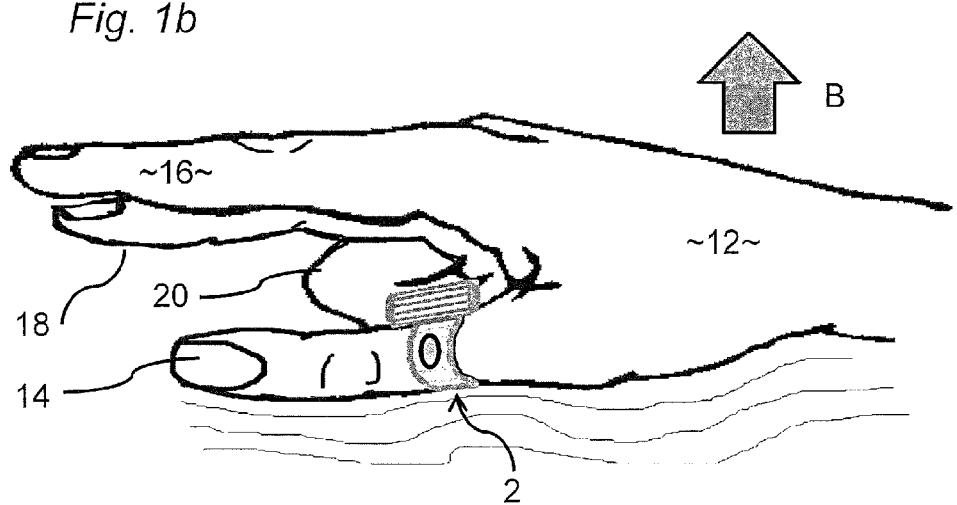
FIG. 1b shows the device of FIG. 1a fitted to a user's thumb.
Figure 1C:
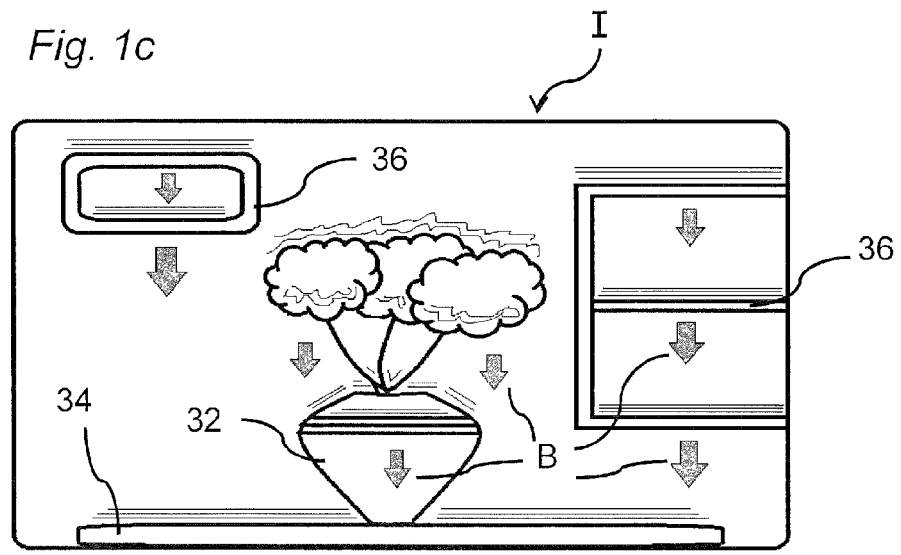

FIG. 1a is shows a device 2 for fitting to a user's thumb comprising a camera module 4 and an elastic strap 6; the camera module 4 has a lens 8, and a switch 10 is provided on the strap 6 for a user to power down the device 2, and to power it up from a dormant state. The device 2 is fitted to a user's thumb 14 (see FIG. 1b) with the camera lens 8 pointing along the user's thumb (those skilled in the art will appreciate that the device 2 could alternatively be fitted onto a user's hand or wrist, though it is presently considered the best mode to mount it to the thumb 14). As shown in FIG. 1b, the user's index finger 16 and middle finger 18 are extended, and the user's third finger 20 and little finger (not shown) are curled up into the palm of the hand. As the user moves his hand up, in the direction indicated by the arrow A, items in the camera's field of view I (see FIG. 1c) move in the direction of arrows B. FIG. 1c is an illustrative view of the type of image which could be captured by the camera: in the field of view I are a window 30, a vase of flowers 32, the top of a table 34 and a picture frame 36.

Figure 2:
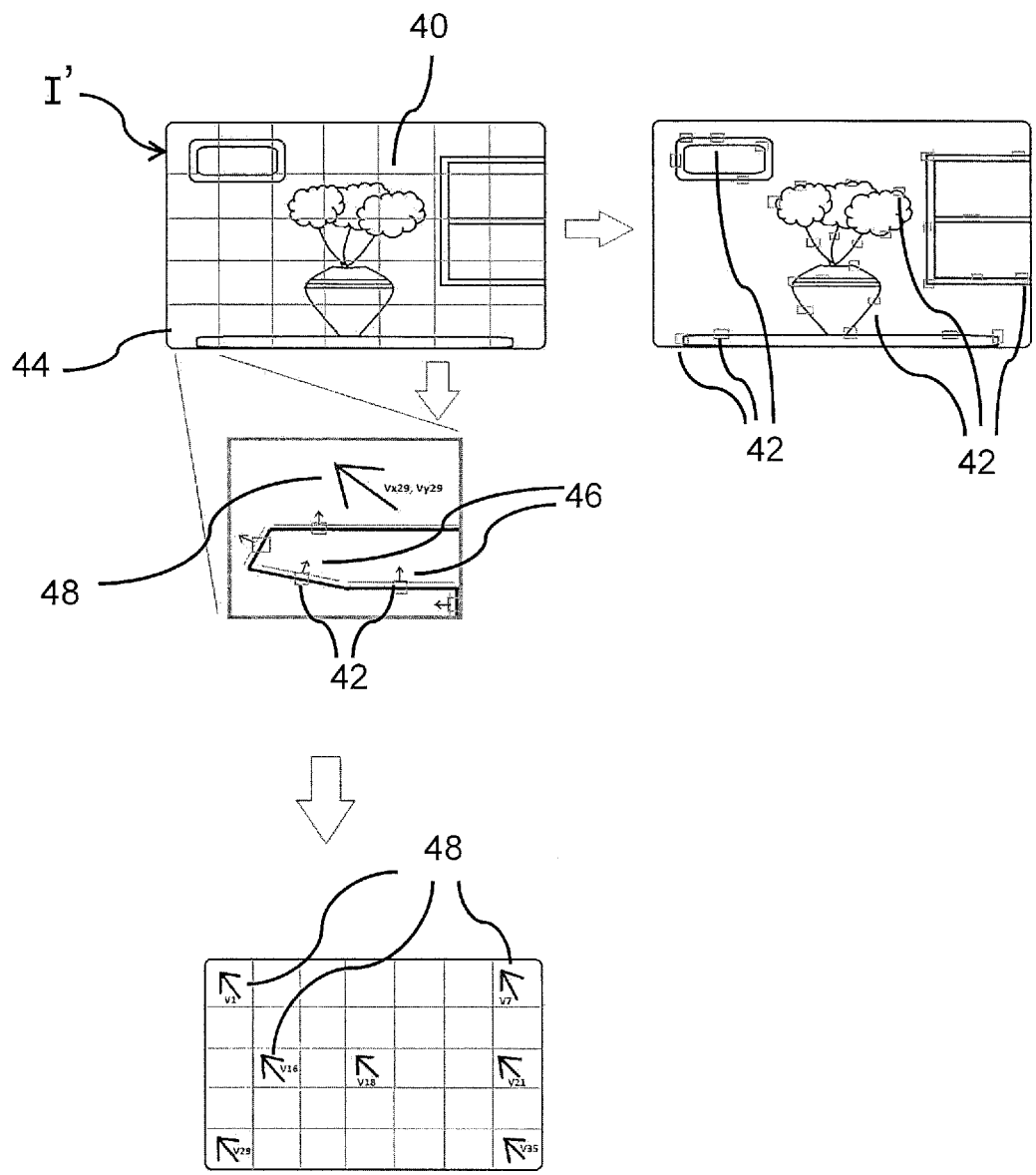
FIG. 2 illustrates the motion tracking process in accordance with the invention.

Referring now to FIG. 2, apparatus in accordance with the invention processes the image I' by dividing the field of view into sectors, here shown as a rectilinear grid pattern 40, and identifying for as many individual sectors elements of the image I' which have a high contrast 42, such as a corner, horizontal or vertical line or junction; by "high contrast" is meant any point where a dark pixel is immediately adjacent a light pixel. Examples of such high contrast areas are indicated by the boxes in the view to the right hand side of FIG. 2 (for clarity, only a few of these areas are denoted by the reference numeral 42). Immediately beneath image I' is an enlarged view of the bottom left hand sector 44 of the grid 40; this shows the high contrast areas 42. In accordance with the invention, a computer processor (not shown) compares the position of these high contrast areas 42 in a first image with their position in a second, later image in order to determine a movement vector 46 for each high contrast area within that sector 44. These movement vectors 46 are combined by an appropriate algorithmic process (such algorithms are well-known in the art) in order to provide a single sector movement vector 48, which represents the movement of the sector 44 in the XY directions and, optionally, rotationally in the XY plane. A further algorithmic process (shown in the bottom image of FIG. 2) combines the sector movement vectors 48 in order to determine the movement of the camera module; as will be apparent to those skilled in the art, this enables the movement of the camera module, and hence the movement of the user's thumb (and therefore hand) to be determined in the X, Y and Z directions (i.e. in three dimensions), and also rotationally about the axis of the camera lens. Because the particular high contrast areas 42 chosen may introduce limitations to this process (for example, if a feature chosen as a high contrast area is linear, the software will only be able to track movement perpendicular to the linear feature) it is preferred that several high contrast areas are available, and that several sector movement vectors can be determined, in order to determine the movement of the user's hand with sufficient accuracy. Thereafter, the determined movement is translated into instructions to move or operate an element of a GUI (not shown) in an analogous way to the way that movement of a conventional mouse is translated for interaction with a GUI, as is well-known in the art. However, because of the ability of the present invention to track movement in three dimensions, and rotationally, apparatus in accordance with the present invention can be utilised to provide three dimensional interactions with a GUI (with suitable, and largely routine, modification of the software involved).

Figure 3A:
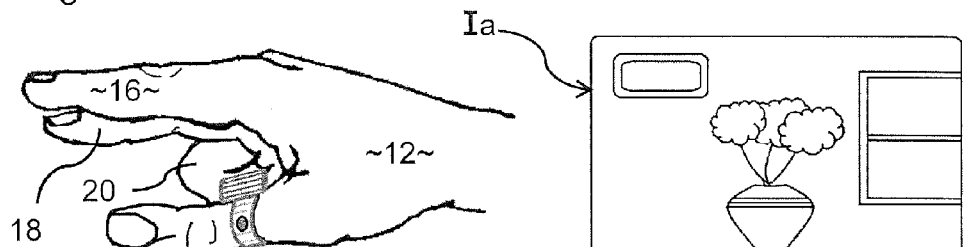
FIGS. 3a to 3d illustrate how the apparatus in accordance with the invention emulates the "click" function of a conventional mouse.

FIGS. 3a to 3d illustrate how a user can emulate the "click" facility of a conventional mouse using apparatus in accordance with the invention. To the left hand side in the Figures is shown a user's right hand 12 (with the device 2 fitted to the user's thumb 14), making different gestures, and to the right there is shown the effect of each gesture made on the field of view of the camera lens. Accordingly, FIG. 3a shows a user's hand in the arrangement of FIG. 1b (thumb 14 and index and middle fingers 16, 18 extended, third finger 20 and little finger curled into the palm); in this case, the image Ia captured in the camera's field of view is, for example, the same as in FIG. c.

Figure 3B:
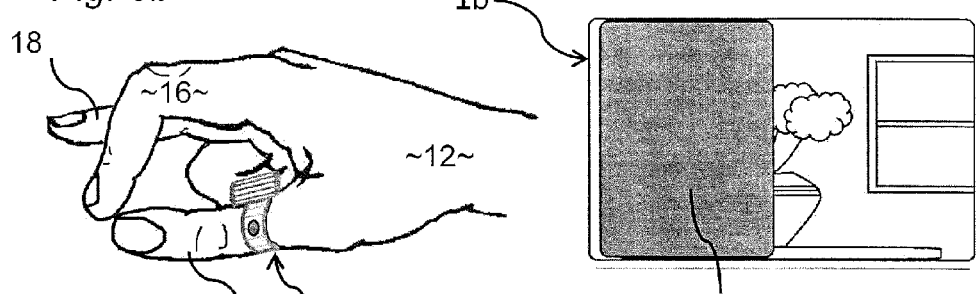
Figure 3C:
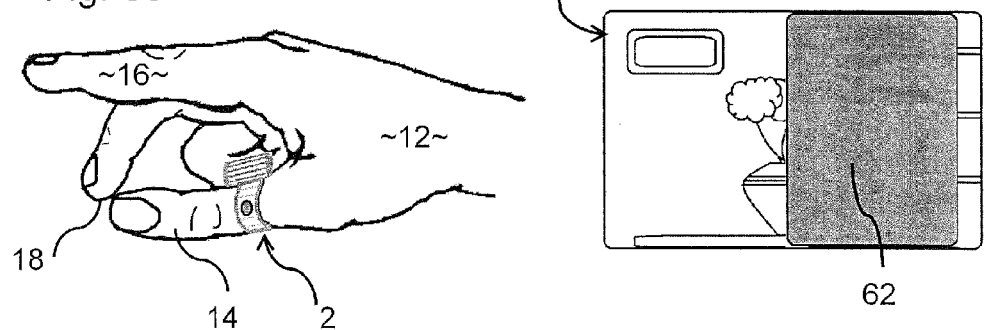
Figure 3D:
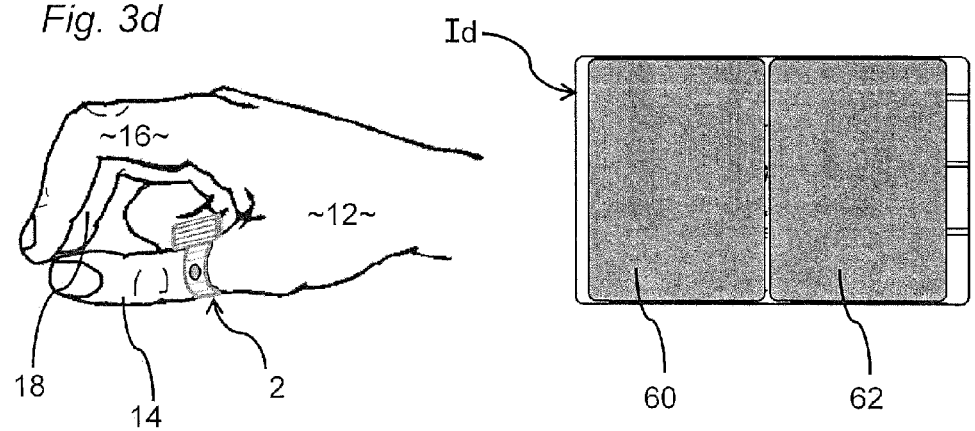

When the user brings the tip of his index finger 16 into contact with the tip of his thumb 14, as shown in FIG. 3b, the effect on the image Ib captured by the camera is to obscure the left hand half 60 of the image. When the user brings the tip of his middle finger 18 into contact with the tip of his thumb 14, as shown in FIG. 3c, the effect on the image Ic captured by the camera is to obscure the right hand half 62 of the image. When the user brings the tips of both his index and middles fingers 16, 18 into contact with the tip of his thumb 14 simultaneously, as shown in FIG. 3d, the effect on the image Ib captured by the camera is to obscure the both halves 60, 62 of the image.

As described above, recognition that the gesture shown in FIG. 3b is the functional equivalent of a "left click" on a conventional mouse, and that the gesture of FIG. 3c is equivalent to a "right click" is a significant and advantageous feature of the present invention. In addition, the gesture of FIG. 3d can provide an additional function, which is not usually offered on a conventional mouse because of the practical difficulty of manipulating the mouse buttons while holding and/or moving the mouse over a surface; this function can be tailored to whatever particular GUI is being interacted with, such as a command to initiate a verbal command application/programme when interacting with a computer, or a particular command when interacting with a game.

Figure 4:
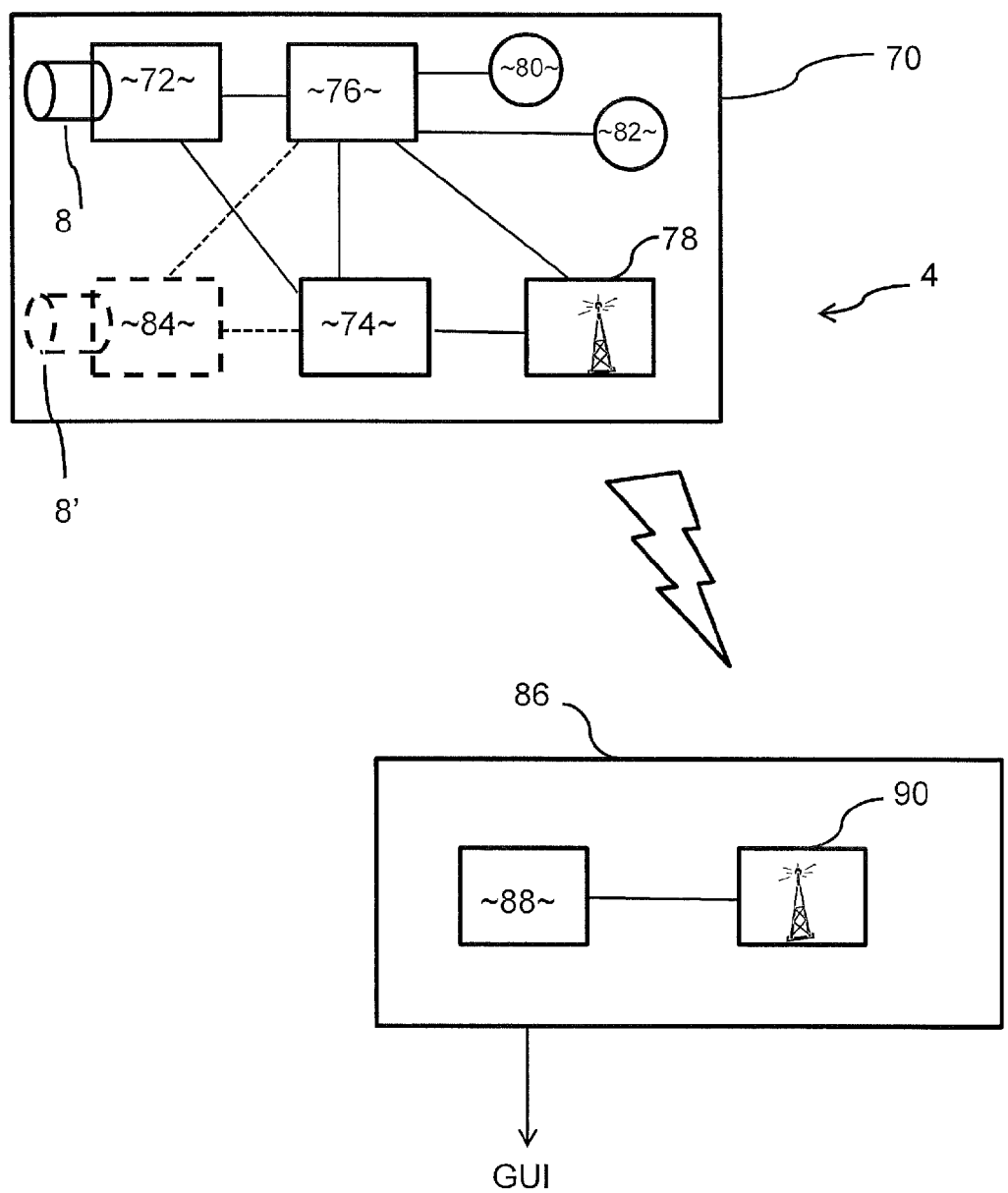
FIG. 4 is a schematic view of an apparatus in accordance with the invention.

FIG. 4 shows schematically an implementation of the apparatus in accordance with the invention. Module 4 of device 2 is illustrated by block 70; integral with module 4/device 2 are: a camera 72 having lens 8, a power source 74 (such as a battery), processor 76, transmitter 78, power off/on switch 80 and accelerometer 82, all connected functionally and electrically as is known in the art. Shown in dotted lines is an optional, additional camera 84 with lens 8'.

In a separate module 86 arranged to communicate with a GUI are: a receiver 90 adapted for communication with transmitter 90, and a second processor 88. The apparatus in FIG. 4 operates thusly: module 4 is attached to a user's thumb or hand; camera 72 captures images as the user's hand moves; processor 76 receives the captured images and reduces them to a signal, which passes to the transmitter 78 and is transmitted to receiver 90, finally processor 88 decodes the signals received by the receiver 90, performs the algorithmic processes described above to determine the absolute motion of the user's hand (if not already done by processor 76) and communicates this as an instruction or series of instructions to the GUI. The separate module may conveniently be co-located with, be incorporated in, or be a driver operated resource of the device which provides the GUI.

If the system is unused for a period, processor 76 may automatically power down module 4; alternatively, the user may operate switch 80, or tap a solid surface like a table to power down, and save battery power. Power up can be accomplished by the user operating switch 80, or merely by shaking of the hand, which is sensed by accelerometer 82.

It will of course be understood that many variations may be made to the above-described embodiment without departing from the scope of the present invention.

For example, as described above, camera 72 could be infra-red enabled. Additionally or alternatively camera could be a standard video camera, and additional camera 84 fitted; this additional camera could be an infra-red camera, or it could be another video camera. Although shown with the two camera lenses 8, 8' substantially aligned, they could instead point in different directions, which would be advantageous when the apparatus was being employed in an environment where there are few high contrast background features for the camera 8 to pick up, or in conditions where there is a low ambient light level. Although described above as having processors 76, 88 in both the hand module 4 and the separate remote, these could be combined, either in the module 4 or the remote module, and the algorithmic processing function may be divided between the two processors, or combined in one (or could even be carried out in the device providing the GUI) with appropriate tailoring of the necessary software.

The invention claimed is:

1. An apparatus for enabling a user to interact with movable control elements of a graphical user interface (GUI) by moving a hand in relation to an element of the GUI, or one or more fingers of said hand relative to a thumb on said hand, the apparatus comprising:
   a camera adapted to be releasably mounted to said hand, and
   a processor adapted to receive signals representative of successive images captured by the camera during movement of said hand, or of movement of a finger of said hand relative to said thumb, to analyse said successive images to determine said movement, and to communicate with the GUI to control elements thereof in accordance with the determined movement
   wherein the processor is adapted to divide the field of view of the camera into a plurality of sectors, at least two of which contain at least one high contrast area, to determine at least one vector relating to the movement of each high contrast area between successive images to determine sector movement vectors for at least two sectors, and to combine the sector movement vectors in order to determine movement of the camera in three translational dimensions and one rotational dimension, and
   wherein the processor is adapted to interpret the obscuring of a portion of one side of the field of view of the camera by a fingertip coming into contact with said thumb as a predetermined instruction to the GUI.

2. The apparatus according to claim 1 wherein the camera is adapted to be mounted to the thumb of said hand.

3. The apparatus according to claim 1 wherein the processor is located remotely from the camera, a transmitter being provided to transmit signals from the camera to a receiver located with the processor.

4. The apparatus according to claim 1 wherein the camera is adapted to be sensitive to high contrast areas in its field of view, and the processor is adapted in its analysis to track said high contrast areas and to compare the position of said high contrast areas in successive images to determine motion of said high contrast areas between images in order to determine movement of said hand.

5. The apparatus according to claim 1 wherein the vectors relating to the movement of each high contrast sector are direction and/or velocity vectors.

6. The apparatus according to claim 1 comprising a switch adjacent the camera operable to power down the camera and/or to power up the camera.

7. The apparatus according to claim 1 comprising an accelerometer.

8. The apparatus according to claim 1 wherein the camera is infra-red enabled.

9. A method of interacting with a GUI using a camera mounted to a hand or thumb of a user, the method comprising moving the hand in relation to an element of the GUI; sensing the absolute movement of the camera in three translational dimensions and one rotational dimension and controlling said element in accordance with the sensed movement, and comprising interpreting the obscuring of a portion of one side of the field of view of the camera caused by a fingertip coming into contact with said thumb as a predetermined instruction to the GUI.

10. The method according to claim 9 wherein the camera is pointed in a direction other than directly at the element of the GUI.

11. The method according to claim 9 comprising interpreting the obscuring of the entire field of view of the camera caused by more than one fingertip of said hand coming into contact with said thumb as a predetermined instruction to the GUI.

12. The apparatus according to claim 2 wherein the processor is located remotely from the camera, a transmitter being provided to transmit signals from the camera to a receiver located with the processor.

13. The apparatus according to claim 2 wherein the camera is adapted to be sensitive to high contrast areas in its field of view, and the processor is adapted in its analysis to track said high contrast areas and to compare the position of said high contrast areas in successive images to determine motion of said high contrast areas between images in order to determine movement of said hand.

14. The method according to claim 10 comprising interpreting the obscuring of a substantial portion of the field of view of the camera caused by a fingertip of said hand coming into contact with said thumb as a predetermined instruction to the GUI.

15. The apparatus according to claim 1 comprising interpreting the obscuring of a substantial portion on another side of the field of view of the camera caused by another fingertip of said hand coming into contact with said thumb as a predetermined instruction to the GUI.

16. The apparatus according to claim 9 comprising interpreting the obscuring of a substantial portion on another side of the field of view of the camera caused by another fingertip of said hand coming into contact with said thumb as a predetermined instruction to the GUI.

* * * * *